Feb. 6, 1940.    A. H. ACE ET AL    2,189,335

TRAILER BRAKE CONTROL

Filed May 8, 1937

Inventors
Arch H. Ace
Loyd R. Harriman
By Owen & Owen
Attorneys

Patented Feb. 6, 1940

2,189,335

UNITED STATES PATENT OFFICE 2,189,335

TRAILER BRAKE CONTROL

Arch H. Ace and Loyd R. Harriman, Bowling Green, Ohio

Application May 8, 1937, Serial No. 141,436

9 Claims. (Cl. 188—142)

This invention relates to trailer brake controls, and is more particularly directed to an actuating means for hydraulic brakes used in connection with a towed vehicle.

The primary object of the invention is the provision of adjustable means to control brakes on a towed vehicle in accordance with the inertia force of the vehicle exerted on a towing car.

Another object of the invention is the provision of means to release temporarily the braking system on the towed vehicle to permit movement of the latter in a reverse direction.

Other objects and advantages of the invention will become apparent as the description proceeds, reference being had to the accompanying drawing, in which—

Figure 1:
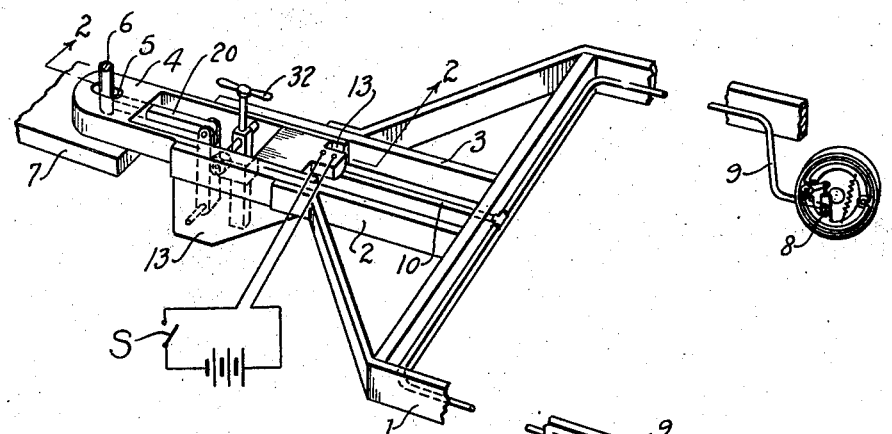
Figure 2:
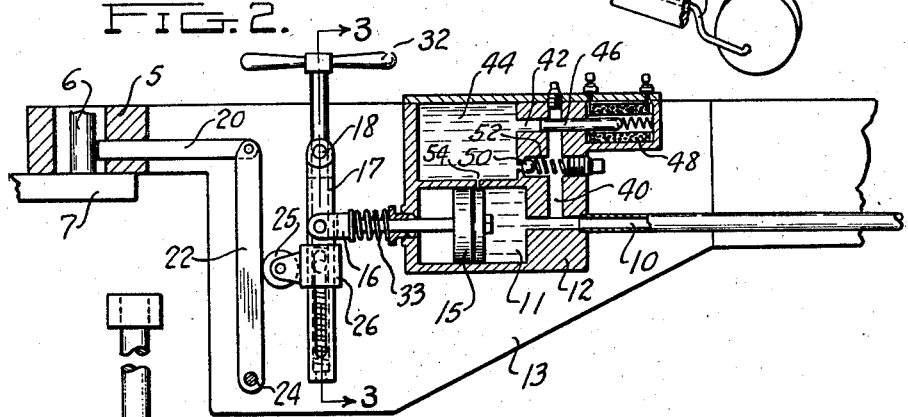
Figure 3:
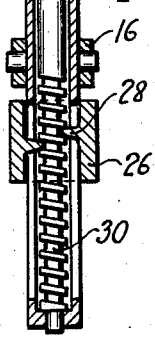

Figure 1 is a fragmentary, diagrammatic, perspective view of a typical installation shown in connection with a frame of a towed vehicle; Fig. 2 is a longitudinal section taken on line 2—2 of Fig. 1, and Fig. 3 is a fragmentary section taken on line 3—3 of Fig. 2.

Referring to the drawing, the present invention is shown in connection with a trailer having a frame 1 provided with a forwardly extending yoke including parallel towing bars 2 and 3 to which a hitch member 4 may be fastened in any suitable manner. The hitch member is provided with an elongated slot 5 which is adapted to receive a hitching pin 6 fastened to a fixed towing plate 7 on the towing vehicle.

The braking system shown is hydraulically operated and includes the usual wheel cylinders 8 connected by branch lines 9 and main line 10 to a master cylinder 11. The master cylinder is formed in a housing 12 which may be received between two depending side plates 13, 13 fixed to the towing yoke of the frame 1.

A brake operating piston 15 is disposed in the master cylinder 11 and is directly connected to an actuating rod 16 extending forwardly from the housing 12 and connected intermediate the ends of a lever arm 17 which latter is pivotally mounted on a pin 18 between the depending plates 13.

The piston is moved by a compound lever including a forwardly extending arm 20 adapted to bear against the fixed pin 6 and a depending arm 22 pivotally mounted between the plates 13 as at 24. The force is transmitted from the depending lever arm 22 through an adjustable member including a roller contact 25 and a yoke 26 slidably mounted about the pivoted arm 17 and adjustable longitudinally thereof.

As shown in Fig. 3, the yoke 26 is provided with inwardly extending fingers 28 received between the threads of a worm 30 which is journalled in the arm 17 and controlled at its upper end by a suitable handle 32. It will be seen that as the worm 30 is turned, the position of the yoke 26 about the arm 17 will be varied vertically and the contact wheel 25 will be moved closer to, or farther from, the pivot point 24 of the force transmitting arm 22.

In operation, the inertia of the towed vehicle tends to crowd it against the towing car so that the towing yoke moves forwardly with relation to the fixed pin 6 carried on the towing car. The force transmitting lever arms 20 and 22 are, therefore, moved rearwardly about the pivot pin 24 and in turn force the contact 25 and its yoke 26 rearwardly to swing the arm 17 about its pivot point 18 and thus move the piston 15 rearwardly in the master cylinder 11. This places the fluid in the braking lines 9 to the wheel cylinders 8 under pressure and causes an actuation of the brakes.

In order that the braking force may be varied in accordance with the load requirements of the towed vehicle, it is necessary to provide means to vary the force applied to the brakes by changing the force applied to the piston 15. For this reason, the adjustable contact 25 is provided so that the action of the brakes may be varied by changing the point of application of the operating force to the pivot point 24. It will be seen that a given crowding movement of the towing vehicle will have a greater effect on the piston 15 as the contact 25 is moved away from the pivot 24, and that the braking action may be softened by moving the contact 25 closer to the pivot 24 or downwardly on the arm 17 in Fig. 2.

A suitable coil spring 33 may be provided to return the parts to their normal position when the crowding force is released.

In order that the trailer may be moved in a reverse direction without the actuation of the brakes, as is necessary in certain maneuvers, it is necessary to provide means to temporarily release the trailer braking system. To accomplish this, the housing 12 may be provided with an upwardly extending passage 40 communicating with the main line 10 and cylinder 11 of the braking system and adapted to be placed in controlled communication through a passage 42 with a fluid reservoir 44 in the housing 12. The passage 42 is preferably controlled by a spring pressed piston type valve 46 which may be moved out of its normal position by a solenoid 48. When the valve 46 is actuated by the solenoid, passages 40 and 42

42 will be thrown in open communication so that fluid may pass through the cylinder 11 to the reservoir 44 instead of to the wheel cylinders 8 where it would normally act on the trailer brakes. When the reversing force is released, it is necessary to provide means which will quickly restore the fluid to the cylinder 11 to the trailer braking system from the reservoir 44. To this end a ball check valve 50 normally held in seating position by a coil spring 52 may be provided. It will be seen that as suction occurs in the passage 40 due to a forward movement of the piston 15, the ball check valve 50 will be unseated and fluid will flow freely from the reservoir 44 through the passage 40 through the cylinder 11. The filling may be accentuated by placing the cylinder 11 in direct communication with the reservoir 44 by a small passage 54 so that as the piston 15 moves forwardly of the passage, fluid will flow by gravity from the reservoir to the master cylinder.

The solenoid 48 may be operated by any suitable circuit closer associated with the towing vehicle, either in the transmission thereof or adjacent the driver's seat. The circuit closer is diagrammatically illustrated at S in Fig. 1.

It will be seen that the present invention provides a simple and efficient means to control the braking force applied to the hydraulic braking system of a towed vehicle, and further provides an efficient means to vary the braking action in accordance with the load carried by the trailer.

While the invention has been described in connection with a particular assembly, it should be readily appreciated that various changes may be made in the form and disposition of the parts without departing from the spirit of the appended claims.

What we claim is:

1. A brake actuating device for towed vehicles having hydraulic brakes including, a master cylinder and a piston operating therein, a lever arm connected to said piston and pivoted at one end, actuating means abutting a fixed point on a towing vehicle and carried by the towed vehicle, and an adjustable contact point disposed between said lever arm and said actuating means.

2. A brake actuating device for towed vehicles having hydraulic brakes including, a master cylinder and a piston operating therein, a lever arm connected to said piston and pivoted at one end, actuating means abutting a fixed point on a towing vehicle and carried by the towed vehicle, a fluid reservoir adjacent said master cylinder, and means to place said fluid reservoir and master cylinder in open communication whereby movement of said piston will force fluid into the reservoir instead of actuating the hydraulic brakes.

3. A brake actuating device for towed vehicles including, brake operating means, a lever arm connected to said operating means and pivoted at one end and adapted to exert pressure on said operating means, means to actuate the lever arm from the towed vehicle, and means to vary the pressure exerted by the lever arm including an adjustable fulcrum carried by the lever arm and adapted to transmit force from said actuating means.

4. A brake actuating device for towed vehicles including, brake operating means, a lever arm connected to said operating means and pivoted at one end and adapted to exert pressure on said operating means, means to actuate the lever arm from the towed vehicle, and means to vary the pressure exerted by the lever arm including an adjustable fulcrum disposed between said lever arm and said actuating means.

5. A brake actuating device for towed vehicles having hydraulic brakes including, a master cylinder and a piston operating therein, a lever arm connected to said piston and pivoted at one end, means to actuate the lever arm from the towed vehicle, and an adjustable contact point disposed between said lever arm and said actuating means.

6. A brake actuating device for towed vehicles having hydraulic brakes including, a master cylinder and a piston operating therein, a lever arm connected to said piston and pivoted at one end, means to actuate the lever arm from the towing vehicle, a fluid reservoir adjacent said master cylinder, and means to place said fluid reservoir and master cylinder in open communication whereby movement of said piston will force fluid into the reservoir instead of actuating the hydraulic brakes.

7. The combination with an automobile and a trailer towed thereby, said trailer having hydraulic actuated brakes on its wheels, of means to actuate said brakes including a cylinder and a piston therein, communication means between said cylinder and said hydraulic brake actuating means, liquid in said cylinder and said communicating means, means actuated by movement of said trailer toward said automobile to compress the fluid in the cylinder, a liquid receiving chamber, a passage between said chamber and said cylinder, a valve in said passage, and electrical means to actuate said valve to permit flow of liquid from said cylinder to said chamber.

8. In a hydraulic brake-operating mechanism for a vehicle train, including a set of fluid-operated brakes, a cylinder and fluid operating piston therein, means for imparting movement to said piston and fluid to operate said brakes, an electrically operated valve for permitting the escape of said fluid from said cylinder for rendering said movement ineffective.

9. In a hydraulic brake-operating mechanism for a vehicle train, including a set of fluid-operated brakes, a cylinder and fluid operating piston therein, means for imparting movement to said piston and fluid to operate said brakes, an electrically operated valve for permitting the escape of fluid from said cylinder for rendering said movement ineffective, and a switch for operating said valve.

ARCH H. ACE.
LOYD R. HARRIMAN.